(12) United States Patent
Fujiyama et al.

(10) Patent No.: US 11,614,180 B2
(45) Date of Patent: Mar. 28, 2023

(54) VALVE ACTUATOR

(71) Applicant: TAKATORI SEISAKUSHO Co., Ltd., Ukiha (JP)

(72) Inventors: Kojiro Fujiyama, Ukiha (JP); Haruhiko Takahashi, Kawasaki (JP)

(73) Assignee: TAKATORI SEISAKUSHO Co., Ltd., Ukiha (JP)

( * ) Notice: Subject to any disclaimer, the term of this patent is extended or adjusted under 35 U.S.C. 154(b) by 0 days.

(21) Appl. No.: 17/789,502

(22) PCT Filed: Dec. 27, 2019

(86) PCT No.: PCT/JP2019/051504
§ 371 (c)(1),
(2) Date: Jun. 27, 2022

(87) PCT Pub. No.: WO2021/131036
PCT Pub. Date: Jul. 1, 2021

(65) Prior Publication Data
US 2023/0034890 A1    Feb. 2, 2023

(51) Int. Cl.
*F16K 31/05*   (2006.01)
*F16K 31/04*   (2006.01)

(52) U.S. Cl.
CPC ............ *F16K 31/05* (2013.01); *F16K 31/047* (2013.01)

(58) Field of Classification Search
CPC .............................. F16K 31/05; F16K 31/047
See application file for complete search history.

(56) References Cited

U.S. PATENT DOCUMENTS

| 11,078,997 B2 * | 8/2021 | Forrester, Jr. ............. F16H 7/02 |
| 11,473,695 B2 * | 10/2022 | Fujiyama ............ F16K 37/0041 |
| 2018/0216712 A1 | 8/2018 | Forrester, Jr. et al. |

FOREIGN PATENT DOCUMENTS

| JP | 30-174 Y1 | 1/1955 |
| JP | 2015-224759 A | 12/2015 |
| JP | 2016-109203 A | 6/2016 |
| JP | 2019-221012 A | 12/2019 |

* cited by examiner

*Primary Examiner* — Eric Keasel
(74) *Attorney, Agent, or Firm* — Heedong Chae; Lucem, PC

(57) ABSTRACT

A valve actuator has an actuator body and a valve attachment part. Further, the actuator body has a case, a motor, a belt transmission part, and a worm reduction gear. Further, the actuator body has a bracket part.

9 Claims, 15 Drawing Sheets

(a)

(b)

(c)

(d)

(a)

(b)

(c)

- PRIOR ART -

VALVE ACTUATOR

TECHNICAL FIELD

The present invention relates to a valve actuator. More specifically, the present invention relates to a valve actuator that can easily be attached to a manual valve, can motorize the valve, is sufficiently reduced in size so as to be placeable in a narrow installation space, has excellent power transmission performance, and is capable of high precision control.

BACKGROUND ART

Conventionally, an actuator has been widely used as a drive source that converts energy, such as electric energy or hydraulic energy, into mechanical motion and actuates devices.

Further, various types of actuators exist according to their operating principle types or their purposes of use, and a valve actuator that is connected to a valve and opens and closes the valve by means of the rotational force of a motor has been proposed in, for example, Patent Literature 1.

Further, many valves are used in ship piping to control the fluid flowing through the piping. In order to reduce the labor of opening and closing a huge number of manual valves, there is a strong demand to motorize the manual valves provided in the piping by means of valve actuators.

Such a need to motorize the manual valves is expected to increase in the future not only in the case of new shipbuilding but also during maintenance or retrofitting a ship already in service.

Under these circumstances, a conventional valve actuator for motorizing an existing manual valve is attached by, for example, the following method. Hereinafter, the method will be described with reference to FIG. 15.

First, a handle 101 and a handle support column 102 of a manual valve 100 are removed from a valve body (see FIG. 15(a)) and a mounting bracket 104 is fixed to the valve body (see FIG. 15(b)). Then, a valve actuator 103 is attached to the mounting bracket 104 (see FIG. 15(c)).

CITATION LIST

Patent Literature

Patent Literature 1: Japanese Published Unexamined Patent Application No. H9-329259

SUMMARY OF INVENTION

Technical Problem

Here, in the conventional valve actuator for motorizing the manual valve in a ship, the size of the entire valve is increased after the attachment of the valve actuator as compared with before the attachment. In particular, the size of the valve is significantly increased in the height direction.

However, inside a ship, a plurality of pipes are densely arranged in a limited narrow space and there are many places where the distance between the pipes is short. Thus, there is a problem that a space sufficient to arrange the valve actuator cannot be secured depending on the distance between adjacent pipes.

Further, in a process of attaching the conventional valve actuator, it is necessary to use a tool such as a spanner and it may be difficult to perform work using the tool in a narrow space where pipes are densely arranged.

Furthermore, the process of attaching the conventional valve actuator is complicated, so that a valve actuator that can be attached more easily is desired. Further, it is necessary in the conventional valve actuator to prepare a mounting bracket in accordance with the size of the manual valve.

Further, due to the existence of the foregoing problems, in most cases, an existing manual valve is removed from the pipe and a motorized valve is newly installed at the time of the motorization of the valve. At that time, the replacement with the motorized valve is performed within the service life of the manual valve and the manual valve is discarded, which leads to a rise in costs.

The present invention has been devised in view of the foregoing points, and an object thereof is to provide a valve actuator that can easily be attached to a manual valve, can motorize the valve, is sufficiently reduced in size so as to be placeable in a narrow installation space, has excellent power transmission performance, and is capable of high precision control.

Solution to Problems

In order to solve the foregoing object, an actuator of the present invention includes a case, a motor having a rotary shaft that is disposed inside the case and serves as a drive source, a first pulley that is attached to the rotary shaft of the motor, a second pulley that is paired with the first pulley and has a diameter larger than that of the first pulley, a belt that is stretched between the first pulley and the second pulley to connect the first pulley to the second pulley in order to rotate the first pulley and the second pulley in the same direction, a worm reduction gear that has a worm portion and a worm wheel such that the second pulley is attached to the worm portion and a worm wheel is orthogonally engaged with the worm portion in order for the worm portion to orthogonally drive the worm wheel by meshing of gears between the worm portion and the worm wheel where the worm reduction gear is disposed inside the case, a valve attachment part that is attached to a preexisting valve (existing at the time of installing the valve actuator) having a handle and supports the case above the handle, and a bracket part that is attached to the worm reduction gear, is configured to be rotatable by a driving force of the motor, is disposed between the case and the handle, and is fitted to the handle to open and close the preexisting valve.

Here, by the motor serving as a drive source and having a rotary shaft, the first pulley attached to the rotary shaft, the second pulley paired with the first pulley, the belt stretched between the first pulley and the second pulley, the worm reduction gear having the worm portion and the worm wheel such that the second pulley is attached to the worm portion and the worm wheel is arranged orthogonally to the worm portion to perform power transmission by the meshing of gears with the worm portion, and the bracket part attached to the worm reduction gear, configured to be rotatable by the driving force of the motor, and fitted to the handle to open and close the preexisting valve, torque can be output from an output of the motor to open and close the valve by the bracket part. That is, electric power can be supplied to the motor to motorize the valve.

Further, the bracket part is disposed between the case and the handle and fitted to the handle, whereby the torque obtained from the motor and the worm reduction gear inside the case can be directly transmitted to the handle of the valve. Further, it becomes easy to reduce the size of the entire actuator.

Further, by the first pulley attached to the rotary shaft of the motor, the second pulley paired with the first pulley and having a diameter larger than that of the first pulley, and the belt stretched between the first pulley and the second pulley, the rotation speed of the second pulley can be made smaller than that of the first pulley, and the output of the motor can be transmitted to the worm reduction gear. That is, not only the speed reduction ratio of the worm reduction gear but also the speed reduction ratio in accordance with the size ratio of the diameter of the first pulley to the diameter of the second pulley can be obtained, and a high torque can be output from the rotational force of the motor. As a result, a small-output and small-sized motor can be used as a drive source, and the entire actuator can be made smaller.

When the size ratio of the diameter of the first pulley to the diameter of the second pulley is 1:2 or less, it becomes possible to obtain a high speed reduction ratio according to the size ratio of the diameters of the two pulleys while the sizes of the two pulleys are kept as small as possible.

Here, when the size ratio of the diameter of the first pulley to the diameter of the second pulley exceeds 1:2, the second pulley becomes large in size, and the size reduction of the actuator as a whole is hindered.

Further, when an angle formed by the rotary shaft and the belt and an angle formed by the belt and the worm portion are each approximately 90 degrees and the worm wheel is arranged to be surrounded by the rotary shaft, the belt, and the worm portion, the rotary shaft of the motor, the belt, the worm portion, and the worm wheel can be compactly housed in the case. As a result, the entire actuator can be made even smaller.

Further, when a motor driver includes a first CPU for controlling a pulse signal for controlling the position of the rotation of the motor and a second CPU for controlling the first CPU and adjusting the magnitude of the current flowing to the motor considering the sliding resistance when the handle is rotated, a high torque can be output to the motor serving as a drive source by using a small-output and small-sized motor. That is, for example, even if the load increases when the valve is closed, the rotation of the motor can be reduced to increase the current flowing to the motor so as to increase the torque.

Further, when a motor driver that is disposed inside the case and controls the drive of the motor is provided and the motor driver includes a second CPU that controls a first CPU, the motor driver can be reduced in size as compared with a valve actuator for motorizing an existing valve. For example, in a commercially available valve actuator, the function of controlling the first CPU that controls the pulse signal cannot be shared by a CPU for the motor driver, and a main control board is added to the motor driver to have the function of controlling the first CPU. That is, in the commercially available valve actuator, the entire size increases by the size of the separately provided main control board. On the other hand, in the present invention, the motor driver includes the second CPU that controls the first CPU, so that the motor driver can be reduced in size, which accordingly contributes to a size reduction of the entire actuator.

Further, when the motor has an absolute encoder that stores the absolute position of the rotary shaft of the motor, the position control can be performed with high precision. It is noted that storing the absolute position of the rotary shaft herein means that the position information in rotation operation of the rotary shaft is stored even in a power OFF state where the electric power is not supplied to the motor and that a return-to-origin operation is not required when the electric power is supplied to the motor again.

Further, when a maximum current value, which is the maximum current value that can be supplied within a predetermined drive time, is set for the motor and the second CPU adjusts the current flowing to the motor within a range of the predetermined drive time and the maximum current value, a small-output and small-sized motor can be used as a drive source to maximize the capability the motor possesses.

For example, in a general motor, a rated current in which operation is guaranteed even in continuous operation is set, and in a general-purpose controller, it is specified that the motor is driven under operating conditions based on the rated current. Further, a motor manufacturer guarantees that about 3 times the rated current can be determined as the maximum current value (corresponding to a maximum current value in the claims of the present application) if it is a short time. The manufacturer also guarantees that the motor can be rotated at the maximum current value if it is within a specified time (corresponding to a predetermined drive time in the claims of the present application).

Therefore, in the present invention, the second CPU adjusts the current flowing to the motor within the range of the predetermined drive time and the maximum current value, whereby the motor can be driven by applying, to the motor, a current equal to or smaller than the maximum current value in which operation is guaranteed, within the operation time of the range specified by the motor manufacturer. As a result, even if a small-output and small-sized motor is used, it becomes possible to obtain a drive output equal to a case where a large-output and large-sized motor is operated at the rated current.

Further, in the general motor, the operating conditions based on the rated current as described above are set for the operation of the motor in order to correspond to the use of the motor for various purposes. Especially, when a high torque is required, an error will instantaneously occur if the designated number of rotations cannot be maintained, and the motor will stop. Therefore, when the motor is selected in consideration of the operating conditions based on the rated current, a need to select a motor having ample output, that is, having a large size arises.

However, in the present invention, the second CPU can adjust the magnitude of the current flowing to the motor in accordance with the sliding resistance when the handle is rotated, as described above. Therefore, even if a small-output and small-sized motor is used, the number of rotations of the motor is reduced as the load increases, and a large current is supplied at the maximum current value or less to increase the torque, whereby the amount of work required to open and close the handle can be output within the range of the predetermined drive time and the maximum current value specified by the motor manufacturer. Further, a small motor can be used, which contributes to a size reduction of the entire actuator.

Further, when the handle includes a frame portion and a plurality of spoke portions such that the frame portion forms an outer shape of the handle and the plurality of spoke portions connect a center portion of the handle and the frame portion, and the bracket part is formed with slits to be fitted to the spoke portions, a force is transmitted from the bracket part to the spoke portions of the handle so that the handle can be rotated.

Further, when the case is provided with amounting protruding portion that is a substantially cylindrical body protruding from a bottom surface of the case toward the handle, that is disposed to receive the bracket part therein, and that is formed with a plurality of mounting holes on a circumference of an outer peripheral surface of the cylindrical body, and a valve attachment part includes a pair of adapters configured to be attached to and/or detached from the mounting protruding portion via the mounting holes and that sandwich and fasten and secure the mounting protruding portion to the valve attachment part, the rotation angle of the actuator is changed by changing the positions of the mounting holes of the mounting protruding portion to which the adapters are attached, and the actuator can be fixed to the valve attachment part. That is, the degree of freedom in the attaching position at the time of attaching the actuator to the valve can be increased.

Further, in order to achieve the foregoing object, a valve actuator of the present invention includes a case, a motor having a rotary shaft that is disposed inside the case and serves as a drive source, a first pulley that is attached to the rotary shaft, a second pulley that is paired with the first pulley and has a diameter larger than that of the first pulley, a belt that is stretched between the first pulley and the second pulley to connect the first pulley to the second pulley in order to rotate the first pulley and the second pulley in the same direction, a worm reduction gear that has a worm portion and a worm wheel such that the second pulley is attached to the worm portion and the worm wheel is orthogonally engaged with the worm portion in order to perform power transmission by meshing of gears with the worm portion, the worm reduction gear disposed inside the case and configured to rotate a preexisting valve, and a valve attachment part that is attached to the preexisting valve and supports the case above the preexisting valve.

Here, by the motor serving as a drive source and having a rotary shaft, the first pulley attached to the rotary shaft, the second pulley paired with the first pulley, the belt stretched between the first pulley and the second pulley, and the worm reduction gear having the worm portion and the worm wheel such that the second pulley is attached to the worm portion and the worm wheel is arranged orthogonally to the worm portion in order to perform power transmission by the meshing of gears with the worm portion and to rotate the preexisting valve, torque can be output from an output of the motor to open and close the valve by the worm reduction gear. That is, electric power is supplied to the motor and the valve can be motorized. Note that a place where the worm reduction gear is fitted to the valve is the handle of the valve, a valve rod of the valve, a connecting member provided to the valve rod of the valve, etc., and includes a place where a driving force for opening and closing the valve can be directly or indirectly applied.

Further, by the first pulley attached to the rotary shaft of the motor, the second pulley paired with the first pulley and having a diameter larger than that of the first pulley, and the belt stretched between the first pulley and the second pulley, the rotation speed of the second pulley can be made smaller than that of the first pulley to transmit the output of the motor to the worm reduction gear. That is, not only the speed reduction ratio of the worm reduction gear but also the speed reduction ratio according to the size ratio of the diameter of the first pulley to the diameter of the second pulley can be obtained, and a high torque can be output from the rotational force of the motor. As a result, a small-output and small-sized motor can be used as a drive source, and the entire actuator can be made small.

Advantageous Effects of Invention

The valve actuator according to the present invention can easily be attached to a manual valve, can motorize the valve, is sufficiently reduced in size so as to be placeable in a narrow installation space, has excellent power transmission performance, and is capable of high precision control.

BRIEF DESCRIPTION OF DRAWINGS

FIG. 6(a) is a schematic diagram showing a structure of the manual valve, which is an object to be attached, FIG. 6(b) is a schematic diagram showing attachment of a stand portion, and FIG. 6(c) is a schematic diagram showing a fixing place of the stand portion.

FIG. 7(a) and FIG. 7(b) are schematic diagrams showing attachment of a second stand portion, and FIG. 7(c) is a schematic diagram showing attachment of adapters and mounting plates to an actuator body.

DESCRIPTION OF EMBODIMENTS

Hereinafter, embodiments of the present invention will be described to provide an understanding of the present invention.

A valve actuator 1, which is an example of a valve actuator to which the present invention is applied, will be described. Note that a structure in which the valve actuator 1 is provided to a valve 2 is shown in the following example. That is, the valve actuator 1 functions as an actuator that opens and closes the valve 2.

The valve 2 is a device that is installed in a pipe 200 which is provided in a ship and through which a fluid flows (see FIG. 6(a)) and that controls or adjusts the fluid.

Figure 1:
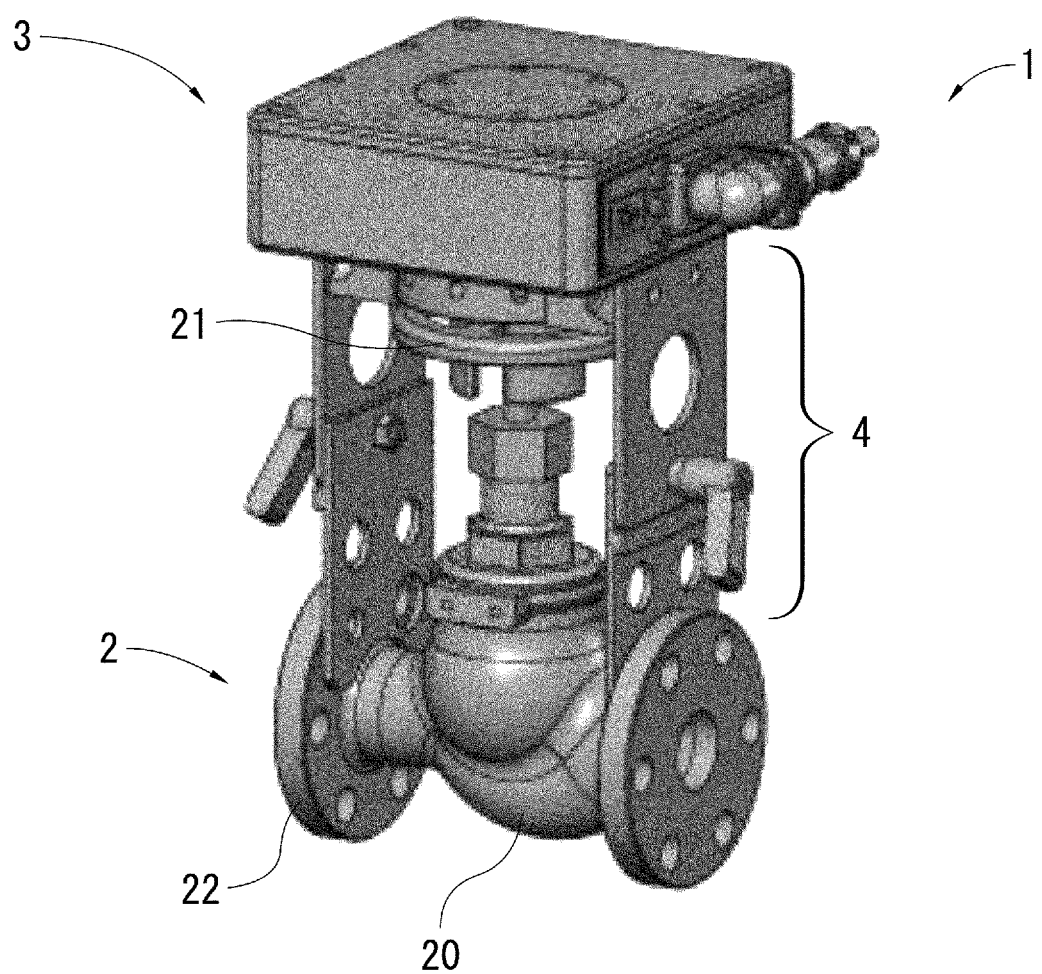
FIG. 1 is a schematic explanatory diagram showing a valve to which a valve actuator, which is an example of a valve actuator according to the present invention, is attached.

Further, the valve 2 is a globe valve including a body 20, a handle 21, a valve rod (not shown), and flanges 22 (see FIG. 1 and FIG. 6(a)). Further, the handle 21 has a frame portion 210 constituting an outer shape, and a plurality of spoke portions 211 connecting the center of the handle 21 and the frame portion 210 (see FIG. 6(a)). Since the structure of the valve 2 is a known globe valve structure, its detailed description will be omitted.

Figure 2:
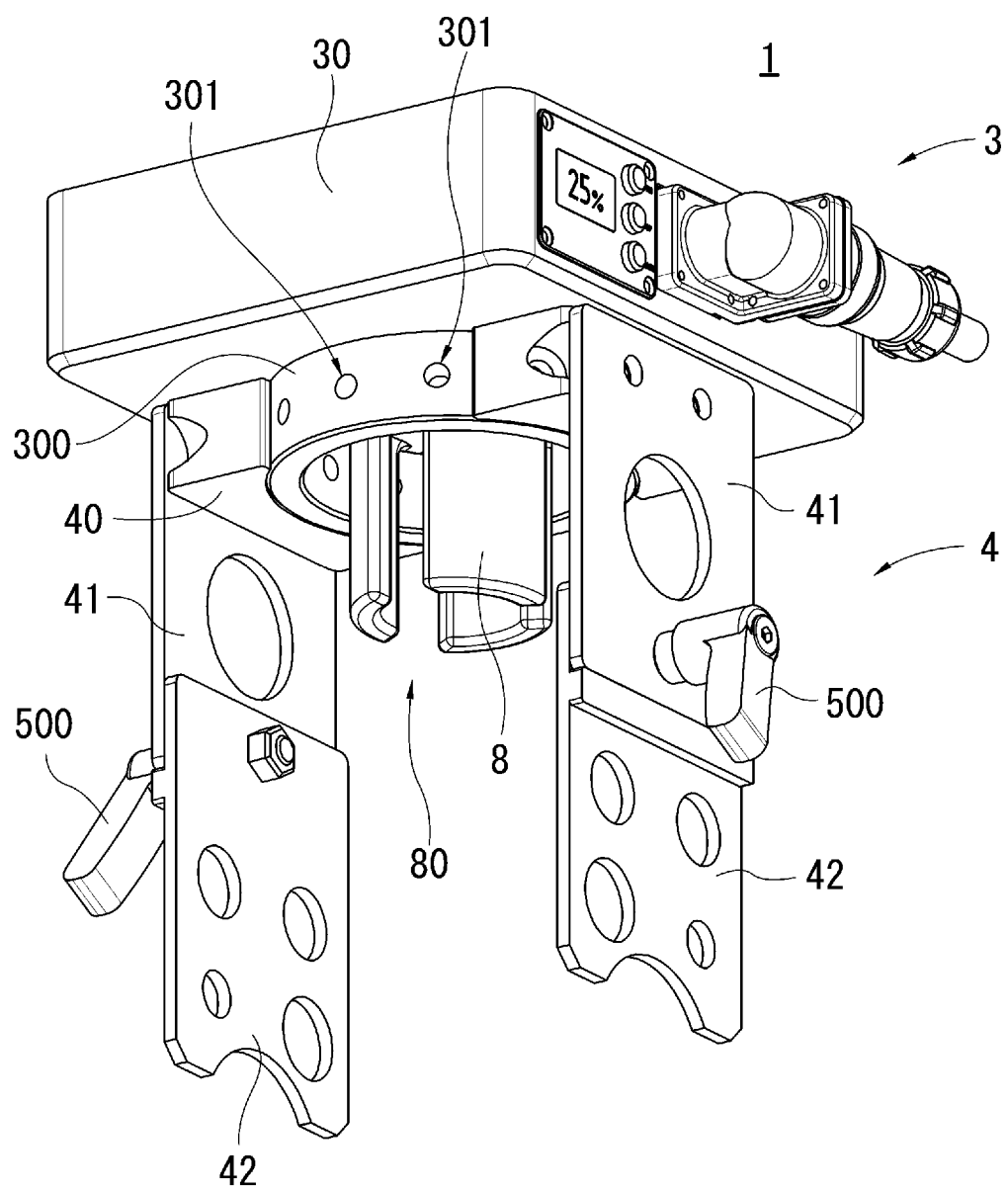
FIG. 2 is a schematic perspective view showing an overall structure of the valve actuator and a valve attachment part.
Figure 3:
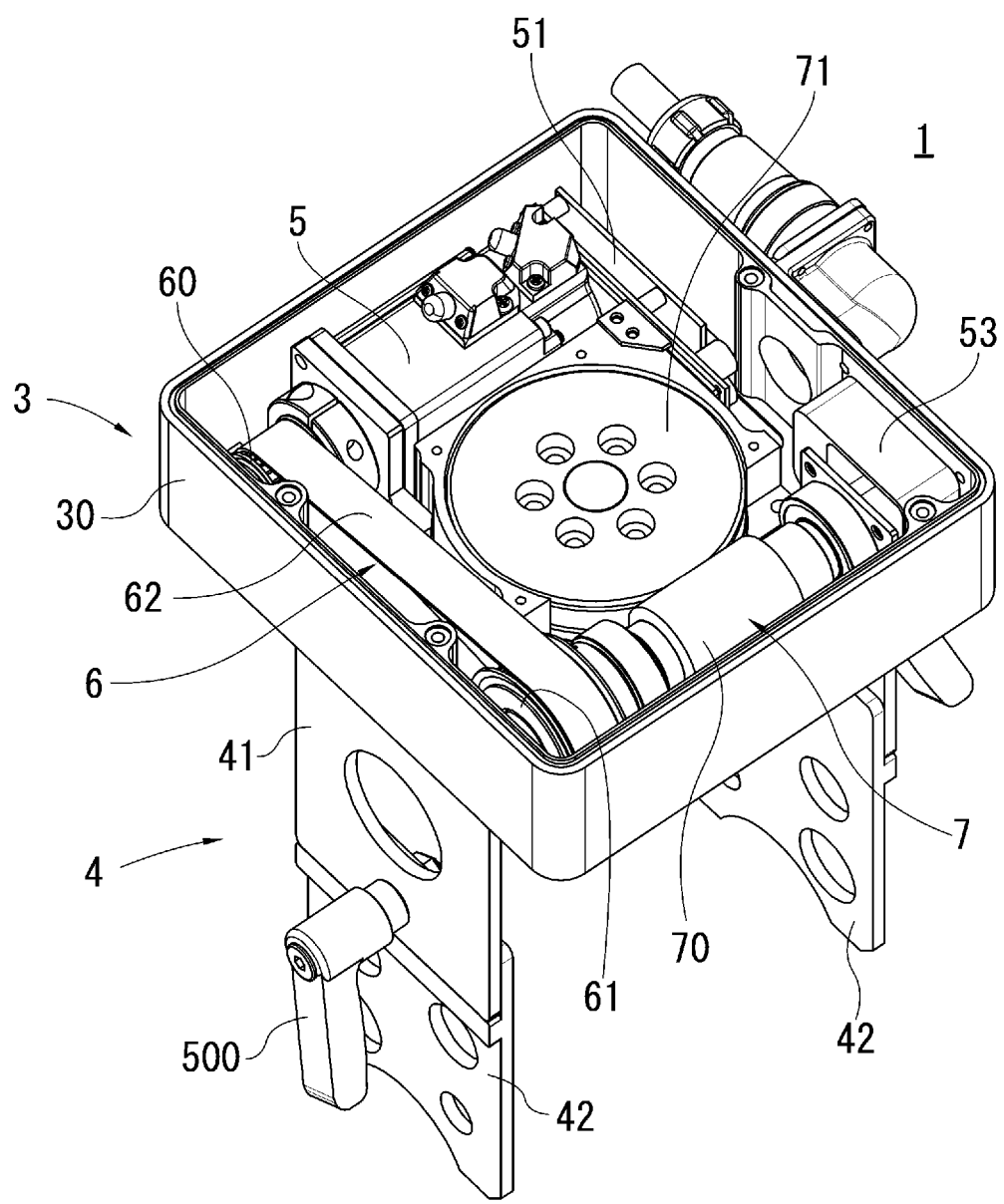
FIG. 3 is a schematic perspective view showing an internal structure of a case in the valve actuator when the valve actuator and the valve attachment part shown in FIG. 2 are viewed from above.

Further, the valve actuator 1 has an actuator body 3 and a valve attachment part 4 (see FIG. 1, FIG. 2, and FIG. 3). The valve attachment part 4 is a member fixed to the valve 2 and for supporting the actuator body 3. Details of a fixing structure of the valve attachment part 4 to the valve 2 and a connection structure of the actuator body 3 and the valve attachment part 4 will be described later.

Here, the type of the valve to which the valve actuator 1 is attached is not particularly limited, and the valve actuator 1 can be attached as long as it is a valve having a rotation mechanism such as a handle for controlling the fluid.

Further, the handle 21 of the valve 2 is not necessarily limited to the one having the frame portion 210 constituting the outer shape and the plurality of spoke portions 211 connecting the center of the handle 21 and the frame portion 210. It is sufficient if the handle 21 is configured to be fitted to a bracket part 8 described later and capable of opening and closing the valve 2. For example, a shape having one spoke portion or a plate-like handle may be adopted.

The structure of the valve actuator 1 will be further described.

The valve actuator 1 has the actuator body 3 and the valve attachment part 4 as described above.

Figure 4:
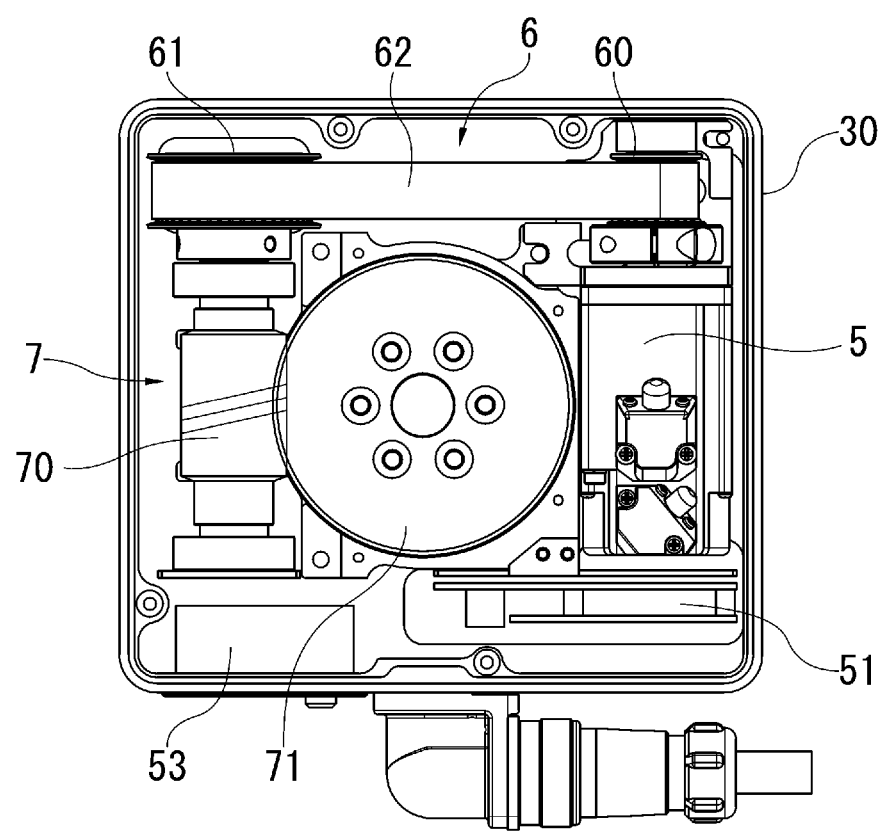
FIG. 4 is a schematic plan view showing the internal structure of the case in the valve actuator.

Further, the actuator body 3 has a box-shaped case 30, a motor 5, a belt transmission part 6, and a worm reduction gear 7 (see FIG. 3 and FIG. 4). Further, the actuator body 3 has a bracket part 8 (see FIG. 2 and FIG. 5). Further, the actuator body 3 has a servo driver 51 and an operator portion 53 (see FIG. 3 and FIG. 4).

Further, the case 30 is an exterior member that houses therein main members constituting the actuator body 3, such as the motor 5, the belt transmission part 6, the worm reduction gear 7, the servo driver 51, and the operator portion 53. Note that in FIG. 3 and FIG. 4, a state in which a top plate of the case 30 is removed is illustrated in order to show an internal structure of the case 30.

Further, the case 30 has a substantially cylindrical protruding portion 300 formed on the bottom surface side thereof, and the bracket part 8 is disposed inside the protruding portion 300. Note that the protruding portion 300 is a member corresponding to a mounting protruding portion in the claims of the present application.

Further, the motor 5 is a drive source in the valve actuator 1 for generating torque for rotating the valve rod of the valve 2 via the bracket part 8. The motor 5 is composed of a brushless motor, which is one of DC-driven DC motors. Further, the motor 5 has a rotary shaft (not shown) (see FIG. 4).

Further, the belt transmission part 6 is a power transmission mechanism for transmitting the power output from the motor 5 to the worm reduction gear 7. Further, the belt transmission part 6 is also a speed reduction mechanism that increases the torque by reducing the rotation speed of the power output from the motor 5 and transmits the torque to the worm reduction gear 7. The power mechanism such as the belt transmission part 6 is also generally referred to as a belt drive.

The belt transmission part 6 has a small diameter pulley 60, a large diameter pulley 61, and a belt 62 (see FIG. 3 and FIG. 4). The small diameter pulley 60 is a member that is attached to the rotary shaft of the motor Sand rotates integrally with the rotary shaft. The large diameter pulley 61 is a member that is attached to a worm portion 70 of the worm reduction gear 7 described later and rotates integrally with the worm portion 70.

Further, the belt 62 is a belt member that is stretched between the small diameter pulley 60 and the large diameter pulley 61. Depressions and projections formed on outer peripheral surfaces of the small diameter pulley 60 and the large diameter pulley 61 and depressions and projections formed on an inner peripheral surface of the belt 62 are fitted to each other, and the small diameter pulley 60, the large diameter pulley 61, and the belt 62 are configured to rotate integrally.

Note that the small diameter pulley 60 is a member corresponding to a first pulley in the claims of the present application. The large diameter pulley 61 is a member corresponding to a second pulley in the claims of the present application.

Here, it is not necessarily required to be configured so that the depressions and projections formed on the outer peripheral surfaces of the small diameter pulley 60 and the large diameter pulley 61 and the depressions and projections formed on the inner peripheral surface of the belt 62 are fitted to each other and the small diameter pulley 60, the large diameter pulley 61, and the belt 62 rotate integrally. For example, the belt 62 may be configured to transmit the power by the frictional force generated between the small diameter pulley 60 and the large diameter pulley 61.

In this case, it can also be designed so that, for the small diameter pulley 60, the large diameter pulley 61, and the belt 62, the frictional force generated between each of the members is adjusted, and when a large force exceeding a certain level is applied and the transmission force becomes large, slip occurs and a force exceeding a certain level cannot be transmitted. As a result, when such a large force that damages a valve seal member (not shown) of the valve 2 is about to be applied, the belt 62 idles and the valve seal member is prevented from being damaged so as to suppress deterioration of sealing performance.

Further, the diameter size of the small diameter pulley 60 and the diameter size of the large diameter pulley 61 have a ratio of the small diameter pulley 60:the large diameter pulley 61=1:2. Further, the rotation speed of the motor 5 can be reduced according to the size ratio of the diameters of the small diameter pulley 60 and the large diameter pulley 61.

That is, from the size ratio of the diameters of the small diameter pulley 60 and the large diameter pulley 61, a speed reduction ratio of 1:2 can be obtained in the belt transmission part 6. According to the speed reduction ratio in the belt transmission part 6 and the speed reduction ratio obtained from the worm reduction gear 7, the torque output from the valve actuator 1 is defined.

Here, a power transmission mechanism using a belt, such as the belt transmission part 6, is generally not used for the actuator because it is difficult to transmit a high torque (it is not suitable for large power transmission).

However, as will be described later, the motor 5 having an output of 100 W and a small size is used in the valve actuator 1 of the present invention. Therefore, the power transmission mechanism using the belt, such as the belt transmission part 6, enables sufficient power transmission. As a result, the rotation speed of the power of the motor 5 is reduced by the belt transmission part 6 and the power can be transmitted to the worm reduction gear 7 while the torque is increased.

Further, the ratio of the diameter size of the small diameter pulley 60 and the diameter size of the large diameter pulley 61 is not necessarily limited to the ratio of the small diameter pulley 60:the large diameter pulley 61=1:2. However, it is preferable that the diameter size of the large diameter pulley 61 is larger than the diameter of the small diameter pulley 60 in order to obtain the speed reduction ratio in the belt transmission part 6. Further, from the viewpoint of avoiding an increase in size of the actuator body 3 due to an increase in size of the belt transmission part 6, it is preferable that the small diameter pulley 60: the large diameter pulley 61=1:2 or less in the diameter size. Further, from the viewpoint of achieving both a reduction in size of the belt transmission part 6 and a high speed reduction ratio in the belt transmission part 6, it is more preferable that the small diameter pulley 60: the large diameter pulley 61=1:2 in the diameter size.

Further, it is not necessarily required to adopt the motor 5 having an output of 100 W, and the value of the output is not limited as long as the actuator body 3 can be made small. For example, a motor having an output of 50 to 100 W can be used in the present invention.

Further, the worm reduction gear 7 is a speed reducer that increases the torque by further reducing the rotation speed of the power transmitted from the belt transmission part 6 and transmits the torque to the bracket part 8. The worm reduction gear 7 has a speed reduction ratio of 1:50.

Further, the worm reduction gear 7 has the worm portion 70 and a worm wheel 71 (see FIG. 3 and FIG. 4). The worm portion 70 and the worm wheel 71 are each provided with a gear portion (not shown). The worm wheel 71 is arranged orthogonally to the worm portion 70, and these are members that perform power transmission by meshing of their gear portions.

Further, the worm wheel 71 has a lower portion connected to the bracket part 8. The worm wheel 71 and the bracket part 8 are configured to rotate integrally. Note that a known wave gear speed reducer can be adopted for the structure of the worm reduction gear 7, and a detailed description of the structure will be omitted.

Here, the worm reduction gear 7 is not necessarily limited to the one having a speed reduction ratio of 1:50, and a worm reduction gear having an appropriately changed speed reduction ratio can be used.

Further, in the case 30, an angle formed by the rotary shaft of the motor 5 and the belt 62 and an angle formed by the belt 62 and the worm portion 70 are each arranged so as to be approximately 90 degrees in plan view. The worm wheel 71 is arranged to be surrounded by the rotary shaft, the belt 62, and the worm portion 70.

As a result, each member of the motor 5, the belt transmission part 6, and the worm reduction gear 7 can be compactly housed within a limited range of the small case 30.

Further, the bracket part 8 is a member that rotates the handle 21 of the valve 2 by the power transmitted from the worm reduction gear 7. That is, the bracket part 8 is a part that makes the torque output from the actuator body 3 act on the handle 21 of the valve 2.

Further, the bracket part 8 has an upper portion fixed to the lower portion of the worm wheel 71. Further, the bracket part 8 has a slit 80 formed from a lower portion toward the upper portion on a side surface of the substantially cylindrical body (see FIG. 2 and FIG. 5). The slit 80 is a part that is fitted to the spoke portion 211 of the handle 21 (see FIG. 5).

Further, a plurality of slits 80 of the bracket part 8 are formed in accordance with the number of spoke portions 211 of the handle 21. Further, the length in the longitudinal direction of the slit 80 is formed to be equal to or longer than that of the stroke distance of the handle 21 that moves up and down by the opening and closing of the valve 2.

As a result, the handle 21 can be moved up and down in the range of the slit 80 of the bracket part 8 when the handle 21 is rotated.

[Control Mechanism of Motor]

Further, the motor 5 is connected to a control system (not shown) and the drive of the motor 5 is controlled. Note that the system controlling the drive of the motor 5 is also connected to an absolute encoder (not shown). The absolute encoder is a member that is attached to the motor 5 and performs detection of the rotated position information in the motor 5 and position control with respect to the rotation operation of the motor 5.

More specifically, the drive of the motor 5 is controlled by a control system composed of a controller and the servo driver 51. The controller is a command unit that outputs an operation command signal to the servo driver 51.

Further, the servo driver 51 is a control unit that outputs a pulse signal to the motor 5 or controls the output so as to follow the command signal from the controller. Note that the servo driver 51 is a member corresponding to a motor driver in the claims of the present application.

Figure 14:
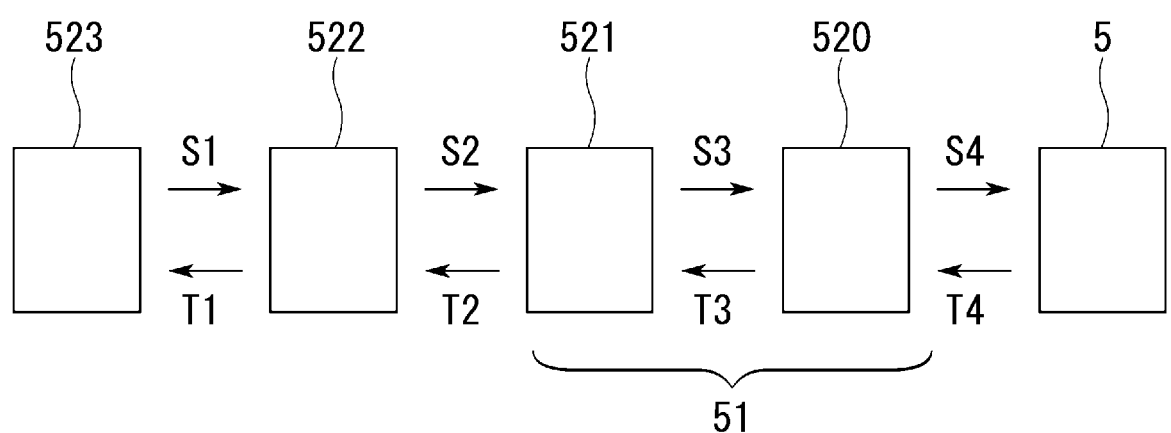
FIG. 14 is a conceptual diagram showing a configuration of a control system.
Figure 15:
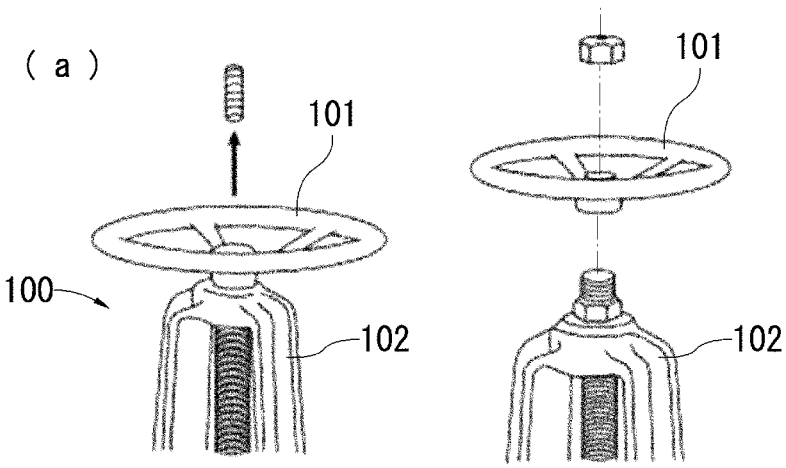
FIG. 15 is a schematic process diagram showing a process of attaching a conventional valve actuator to a valve.
Figure 15:
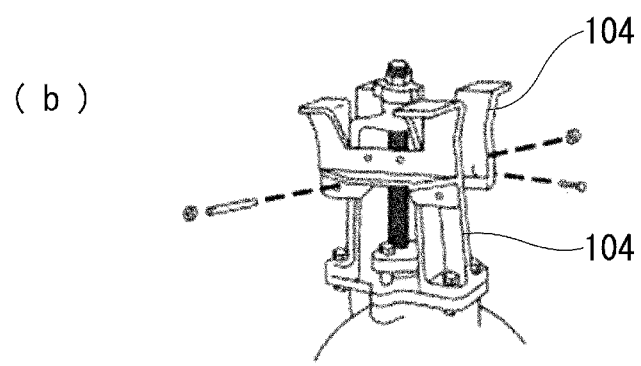
Figure 15:
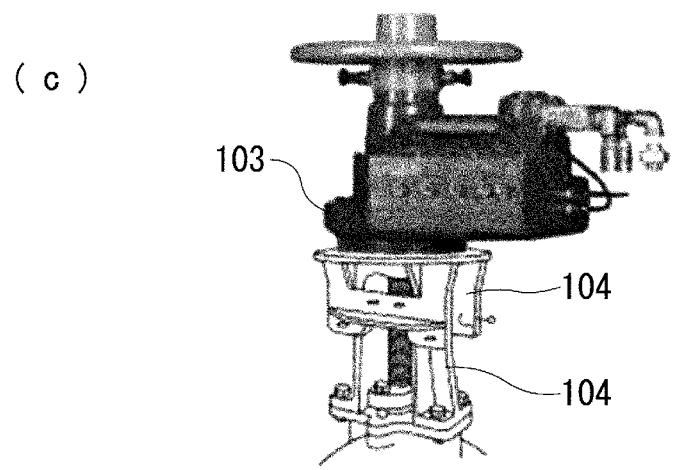

Further, the servo driver 51 has a lower CPU 520 and an upper CPU 521 (see FIG. 14). Note that the lower CPU 520 here is a member corresponding to a first CPU in the claims of the present application. The upper CPU 521 here is a member corresponding to a second CPU in the claims of the present application.

Further, the lower CPU 520 is a member that transmits a pulse signal to the motor 5. Further, the lower CPU 520 is a member that obtains the position information of the rotation position of the motor 5 from the absolute encoder of the motor 5 and transmits, to the upper CPU 521, the information of the rotation position and information on determination results as to whether the position information of the rotation position matches the rotation information instructed by the upper CPU.

Note that in FIG. 14, the transmission of the pulse signal from the lower CPU 520 to the motor 5 is indicated by reference symbol S4, and the transmission of the position information from the motor 5 to the lower CPU 520 is indicated by reference symbol T4.

Further, the lower CPU 520 is configured to output a pulse signal having a pulse modulation frequency of 20 kHz. Therefore, the time for which the pulse signal for rotating the rotary shaft is output becomes short as compared with the conventional pulse signal having a pulse modulation frequency of 10 kHz, and the rotary shaft can be driven more smoothly. As a result, the sound and vibration generated when the motor 5 is driven can be suppressed to a low level.

Further, the upper CPU 521 is a member that controls the lower CPU 520. The upper CPU 521 is a member that determines the rotation speed and the rotation position of the motor 5 and transmits them as rotation information to the lower CPU 520. The upper CPU 521 is configured so that communication control from the outside of the valve actuator 1 is possible.

Further, the upper CPU 521 is a member that obtains, from the lower CPU 520, the position information of the rotation position of the motor 5 and the information on the determination results as to whether the position information of the rotation position matches the rotation information instructed by the upper CPU. Furthermore, the upper CPU 521 is a member that determines correction control of the rotation when the position information of the rotation position of the motor 5 does not match the instructed rotation position (position information of the theoretical value) based on the information obtained from the lower CPU 520.

That is, the upper CPU 521 is configured to independently control the rotation of the motor 5. The details of the control of the rotation of the motor 5 by the upper CPU 521 and the lower CPU 520 will be described later.

Note that in FIG. 14, the transmission of the rotation information from the upper CPU 521 to the lower CPU 520 is indicated by reference symbol S3, and the transmission of the information from the lower CPU 520 to the upper CPU 521 is indicated by reference symbol T3.

Further, the upper CPU 521 is a member that controls the lower CPU 520 that transmits the pulse signal to the motor 5 as described above, and has a function of correcting the pulse signal output from the lower CPU to correct the rotation operation of the motor 5 when the position information on which the motor 5 is rotated does not match the rotation information (theoretical value) instructed to the lower CPU.

Here, in the conventional valve actuator, the servo driver (CPU for driver) has only the lower CPU 520 in the present invention and does not include a member corresponding to the upper CPU 521.

Therefore, in order to provide the upper CPU 521 to the servo driver and enable independent control by the valve actuator alone as in the valve actuator 1 of the present invention in the conventional valve actuator, a need to additionally provide a main control board arises. When such a main control board (for example, generally having a size of 120 mm in width, 120 mm in length, and 18 mm in height) is added, the case 30 or the actuator body 3 becomes large.

Accordingly, the servo driver 51 has the lower CPU 520 and the upper CPU 521 in the valve actuator 1 of the present invention, and the valve actuator 1 can be further reduced in size.

Furthermore, the servo driver 51 is further reduced in size by simplifying members included in the servo driver 51 in the valve actuator 1 of the present invention. For example, an AD converter and a DA converter included in the servo driver of the conventional valve actuator are removed. Further, the DA converter is formed into a chip and included in the servo driver 51.

In this manner, the number of parts included in the servo driver 51 is reduced to reduce the size of the servo driver 51, and the valve actuator 1 can be further reduced in size.

Further, as shown in FIG. 14, the upper CPU 521 may be further configured to be controlled by a network CPU 522 and a top CPU 523 in the control system of the valve actuator 1 of the present invention.

The network CPU 522 is a member that controls the operation of a plurality of valve actuators 1. Further, the network CPU 522 is also a member that transmits a command from the top CPU 523 to each valve actuator 1.

Further, the network CPU 522 is, for example, a member included in a network control box connected to a leader machine that is set in a plurality of valve actuators 1.

The network CPU 522 can be responsible for bidirectional communication with the top CPU 523 and overall control within the group. Further, it is possible to configure a plurality of groups to construct a network.

Further, the top CPU 523 is, for example, a member included in a central monitoring device provided to a steering house, etc., and is a member that grasps the operating status of the piping system and determines the valve operation (blockage of the valve, stop of the valve actuator 1, etc.) when an abnormality occurs.

As described above, the plurality of valve actuators 1 can be collectively controlled in a group unit by including the network CPU 522 and the top CPU 523.

Note that in FIG. 14, the transmission of the information from the network CPU 522 to the upper CPU 521 is indicated by reference symbol S2, and the transmission of the information from the upper CPU 521 to the network CPU 522 is indicated by reference symbol T2. Further, the transmission of the information from the top CPU 523 to the network CPU 522 is indicated by reference symbol S1, and the transmission of the information from the network CPU 522 to the top CPU 523 is indicated by reference symbol T1.

Further, the operator portion 53 is an operation portion for manually changing the settings of the servo driver 51 of the motor 5 and the worm reduction gear 7. When an operator wants to change the setting condition of each member, he/she can operate the operator portion 53 to perform the work. Further, the operator portion 53 has an operation button, a display device, etc. (reference symbol omitted).

Subsequently, a structure of the valve attachment part 4 will be described.

The valve attachment part 4 is a member fixed to the valve 2 and for supporting the actuator body 3, as described above.

Figure 5:
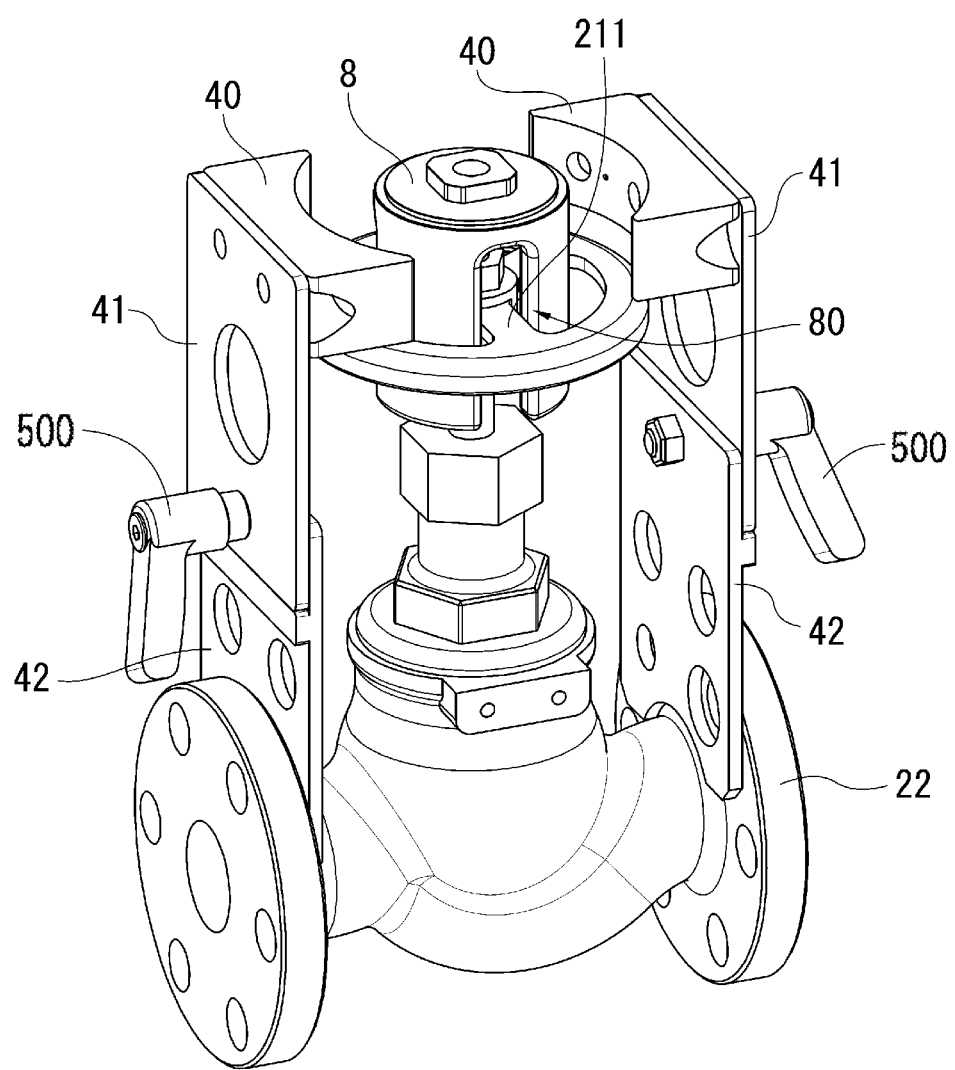
FIG. 5 is a schematic perspective view showing a positional relationship between a bracket part and the valve attachment part in the valve actuator and a structure of the valve attachment part.

The valve attachment part 4 has adapters 40, mounting plates 41, stand portions 42, and clamp knob screws 500 (see FIG. 2, FIG. 3 and FIG. 5). The adapters 40, the mounting plates 41, the stand portions 42, and the clamp knob screws 500 are each arranged so that two are paired with the protruding portion 300 of the case 30 as the center.

Further, the adapter 40 is a member that fixes a structure in which the mounting plate 41 and the stand portion 42 are integrated with the protruding portion 300 of the case 30.

Further, the adapter 40 is configured to select the positions of a plurality of mounting holes 301 formed at a constant interval on an outer peripheral surface of the protruding portion 300 and to be attachable and detachable with respect to the plurality of mounting holes 301. As a result, the actuator body 3 is rotated in a direction indicated by reference symbol R in FIG. 7(c) to change its orientation, and the protruding portion 300 can be fixed to the adapter 40.

For example, in the case of the protruding portion 300 in the actuator body 3, the orientation of the actuator body 3 can be changed and set by about every 30 degrees in the rotation direction indicated by the reference symbol R in FIG. 7(c) by changing the position of the mounting holes 301. As a result, the degree of freedom of installation position of the actuator body 3 can be increased in addition to the structure around the valve 2.

Further, the mounting plate 41 is a member that connects the adapter 40 and the stand portion 42. Further, the stand portion 42 is a member that fixes a structure in which the adapter 40 and the mounting plate 41 are integrated with the flange 22 of the valve 2 (see FIG. 5).

Further, the clamp knob screw 500 is a member that detachably fixes the mounting plate 41 and the stand portion 42. The clamp knob screw 500 can easily fix the mounting plate 41 and the stand portion 42 without using a separate tool by attaching the clamp knob screw 500 to the mounting plate 41 and the stand portion 42.

Hereinafter, a process of attaching the actuator body 3 to the valve 2 using the valve attachment part 4 will be described with reference to the drawings.

Figure 6:
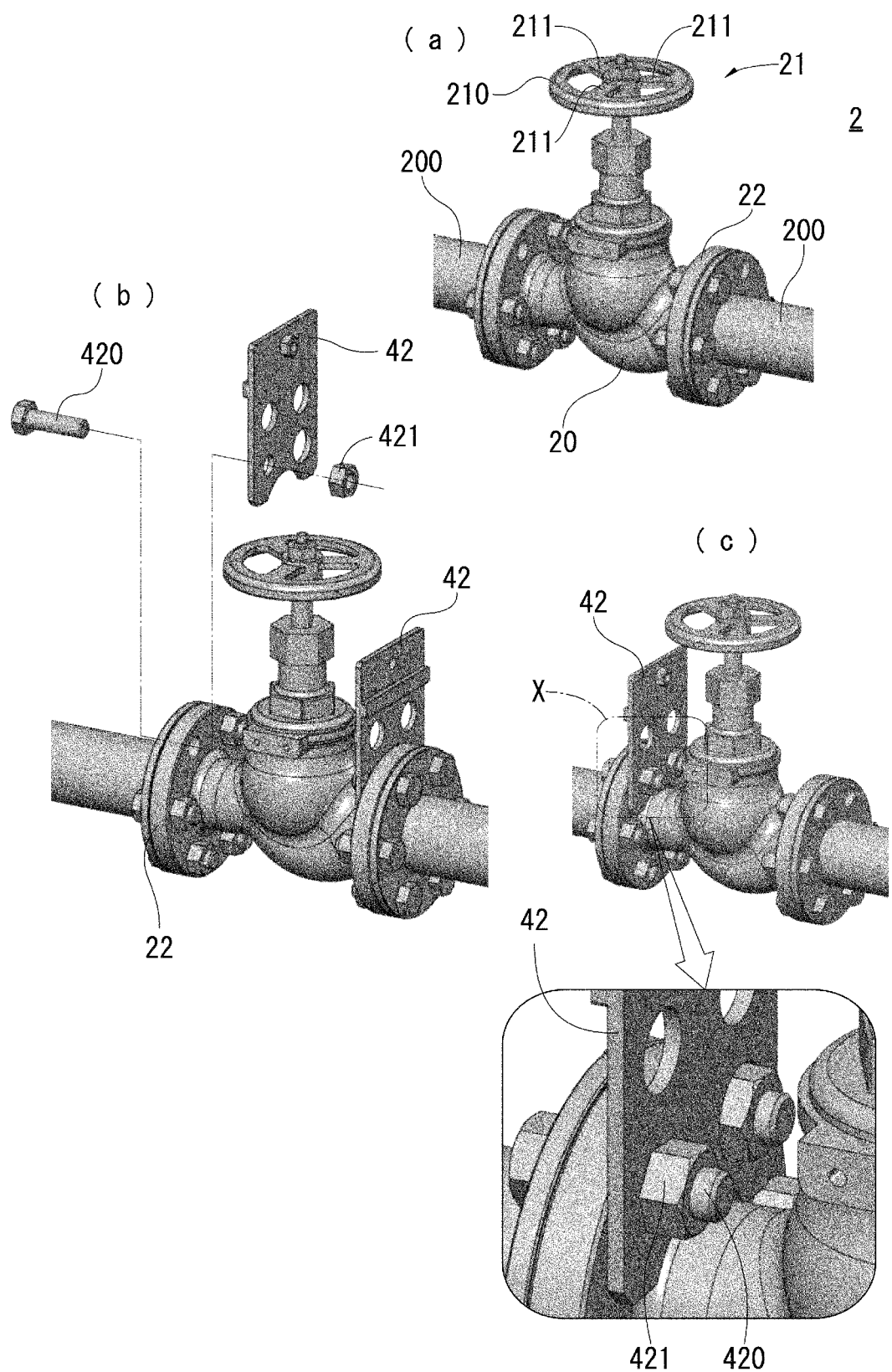
FIGS. 6(a), 6(b), and 6(c) are a schematic process diagram showing a process of attaching the valve actuator to a manual valve, where

First, as shown in FIG. 6(*a*), a manual valve 2, which is an object to which the actuator body 3 is to be attached, is provided to the pipe 200.

As shown in FIG. 6(*b*), the stand 42 is attached to the flange 22 of the valve 2 via a bolt 420 and a nut 421. One stand 42 can be fixed to the flange 22 with a set of bolts 420 and nuts 421. Note that an area indicated by reference symbol X is enlarged to show a place fixed with the bolt 420 and the nut 421 in FIG. 6(*c*).

Figure 7:
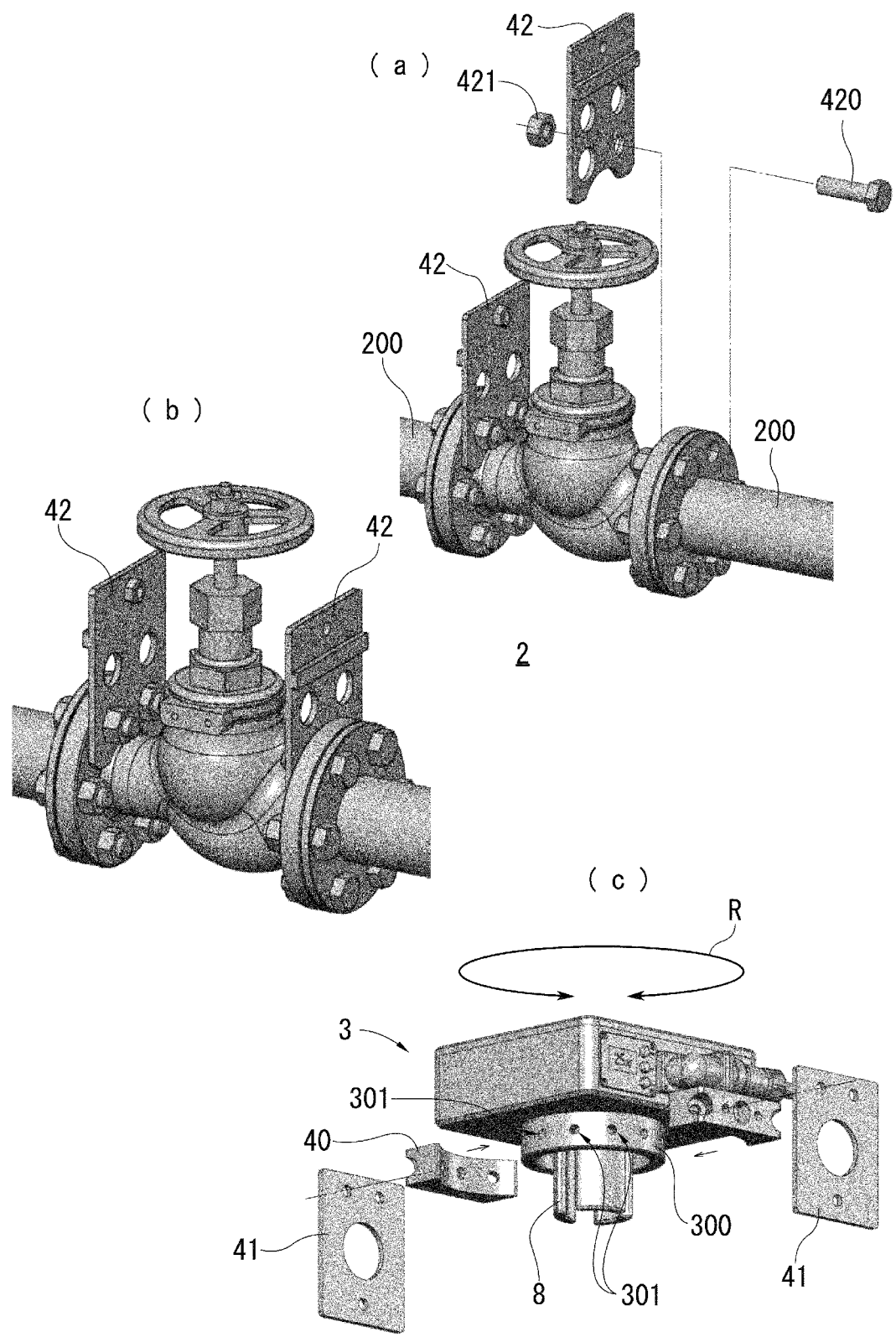
FIGS. 7(a), 7(b), and 7(c) are a schematic process diagram showing a process of attaching the valve actuator to the manual valve, following FIGS. 6(a), 6(b), and 6(c), where

As shown in FIG. 7(*a*) and FIG. 7(*b*), the stand 42 is attached to the other flange 22 via the bolt 420 and the nut 421. By the flow so far, the work of fixing the stands 42 to the valve 2 is completed.

Next, as shown in FIG. 7(*c*), the adapters 40 and the mounting plates 41 are attached to the actuator body 3. As described above, the adapter 40 can select and fix the positions of the plurality of mounting holes 301 formed at a constant interval on the outer peripheral surface of the protruding portion 300.

The outer peripheral surface of the protruding portion 300 is sandwiched and fixed from both sides by the adapters 40, and the adapters 40 and the mounting plates 41 are fixed. By the flow so far, the work of fixing the adapters 40 and the mounting plates 41 to the actuator body 3 is completed.

Figure 8:
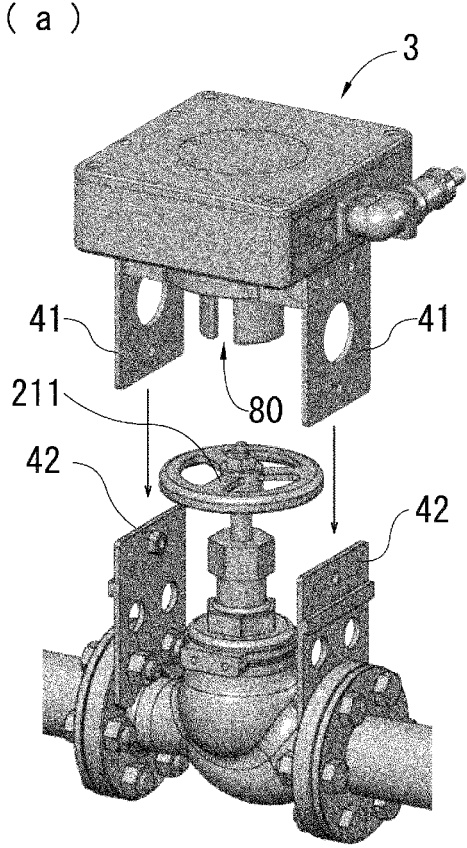
FIG. 8(a) is a schematic diagram showing a state in which the position of the actuator body and the positions of the stand portions are aligned.
FIG. 8(b) is a schematic diagram showing a state in which the mounting plates and the stand portions are fixed with clamp knob screws.
FIG. 8(c) is a schematic diagram showing a state in which attachment of the actuator body to the valve is completed.
FIG. 8(d) is a schematic diagram showing a state in which a lid portion of the case is opened.
Figure 8:
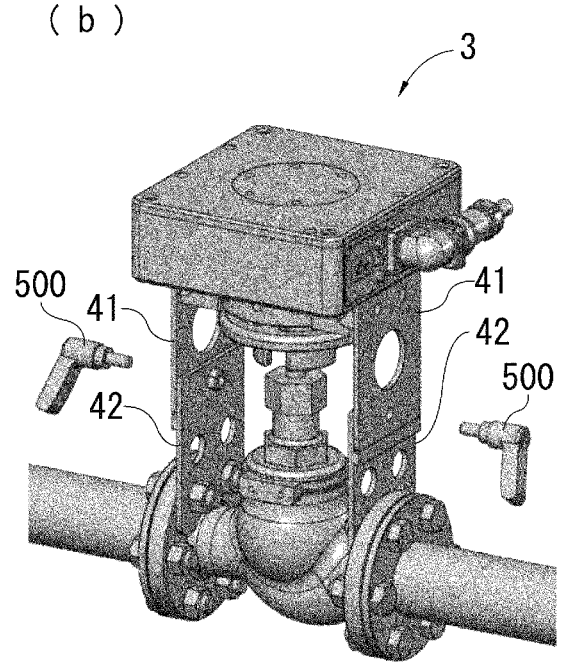
Figure 8:
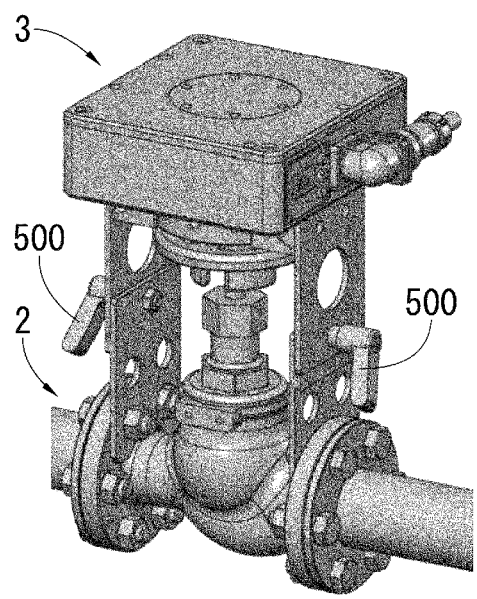
Figure 8:
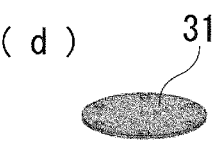
Figure 8:
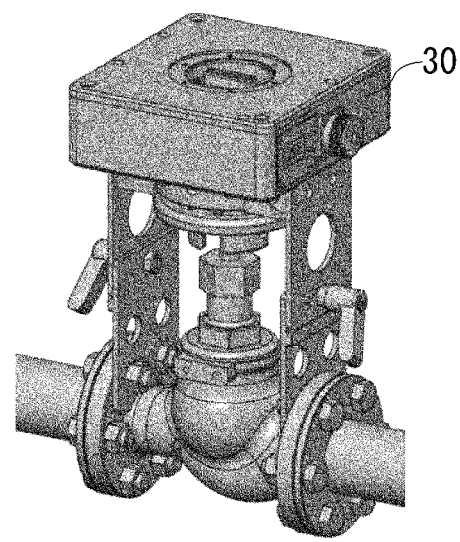

Next, as shown in FIG. 8(*a*), the positions of the mounting plates 41 and the stands 42 and the positions of the slits 80 of the bracket part 8 and the spoke portions 211 of the handle 21 are aligned, and the actuator body 3 is attached to the valve 2.

As shown in FIG. 8(*b*), the positions of places where the mounting plates 41 and the stands 42 are connected are aligned, the clamp knob screws 500 are inserted so as to penetrate both members, and the mounting plates 41 and the stands 42 are fixed.

In the fixing with the clamp knob screws 500, the mounting plates 41 and the stands 42 can be fixed without using a separate tool or connecting member. Further, the fixing is possible by the simple work of inserting the clamp knob screws 500 inward from the outside of the mounting plates 41, so that the clamp knob screws 500 can easily be attached even in a limited work space of a ship.

By the flow above, as shown in FIG. 8(*c*), the attachment of the actuator body 3 to the valve 2 is completed. In this manner, by using the valve attachment part 4, the valve actuator 1 can be arranged with respect to the manual valve 2 to motorize the valve 2 in the simple process.

Further, in the valve actuator to which the present invention is applied, an AC/DC converter can be connected to the actuator body 3 to have a structure compatible with an AC power supply. Hereinafter, an example of the structure and process for connecting the AC/DC converter will be described.

First, as shown in FIG. 8(*d*), the lid portion 30 provided on the top surface side of the case 30 of the actuator body 3 is removed.

Figure 9:
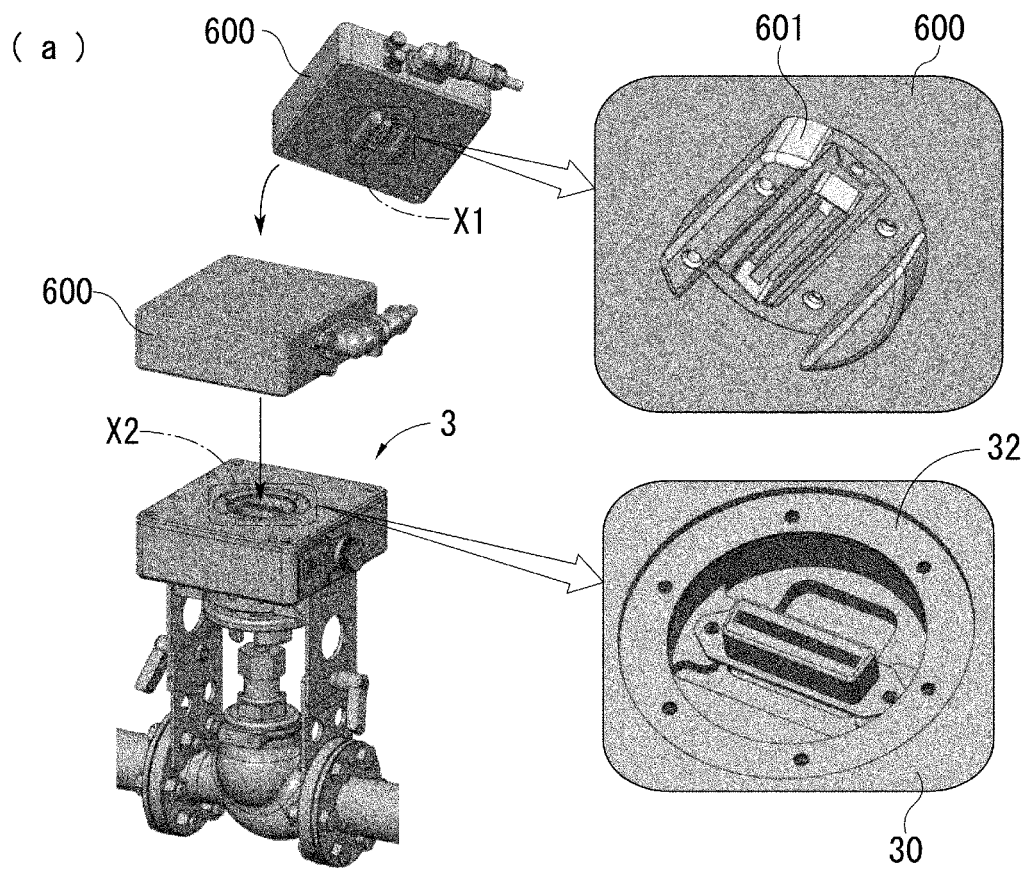
FIG. 9(a) is a schematic diagram showing a state in which an AC/DC converter and the actuator body are connected and FIG. 9(b) is a schematic diagram showing a state in which the AC/DC converter and the actuator body are integrated.
Figure 9:
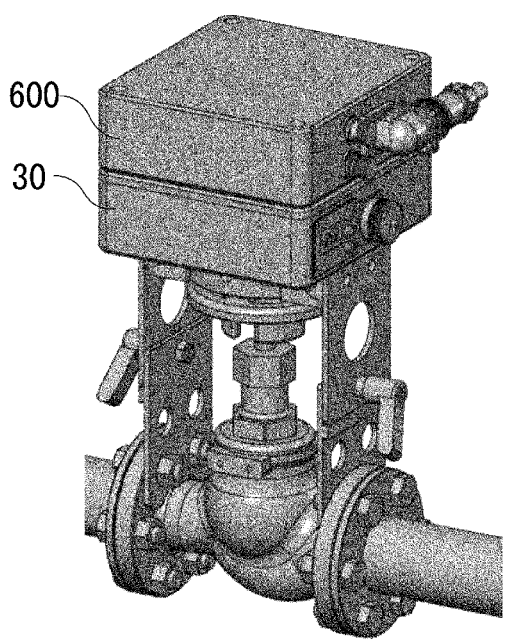

Further, as shown in FIG. 9(*a*), a female connector 32 serving as a connection portion with an AC/DC converter 600 is provided to an upper portion of the actuator body 3. A male connector 601 electrically connectable with the female connector 32 of the actuator body 3 is provided to a lower portion of the AC/DC converter 600.

Note that areas surrounded by reference symbol X1 and reference symbol X2 in FIG. 9(*a*) are places where the female connector 32 and the male connector 601 are formed, and diagrams in which these portions are enlarged are shown on the right side of FIG. 9(*a*).

The actuator body 3 can have a structure compatible with an AC power supply by electrically connecting the actuator body 3 and the AC/DC converter 600 at the portions of the female connector 32 and the male connector 601 (see FIG. 9(*b*)). Further, it is also possible to make the AC/DC converter 600 correspond to a difference in voltage by forming units of the same shape corresponding to different voltages.

[About Control of Motor]

Subsequently, the control of the motor 5 in the valve actuator 1 to which the present invention is applied will be described.

First, in the valve actuator to which the present invention is applied, unlike a general actuator, the valve actuator does not demonstrate versatility in use for various applications. The valve actuator is used for, for example, the following drive applications as in the case where a manual valve is motorized.

(1) The range of rotation operation of an object to be driven falls within rotation operation of several to a dozen of times.

(2) The time during which the rotation operation of the object to be driven is continuously performed falls within one minute or several tens of seconds.

(3) In relation to the conditions of (1) and (2) described above, the rotation operation of the object to be driven is completed at a rotation speed of an output shaft of about several tens of rpm.

(4) The output torque required for the rotation operation of the object to be driven varies according to the change in sliding resistance. Note that the change in sliding resistance includes not only one whose sliding resistance changes due to the original drive as in the opening and closing of the valve but also a change in an object whose sliding resistance changes due to deterioration over time or an object whose sliding resistance changes due to biting of foreign matter such as dust in a rotation mechanism.

Further, the following drive condition is also included when the rotation mechanism (handle 21) moves up and down along with rotation as in the manual valve 2 described above.

(5) The moving stroke of the rotation mechanism of the object to be driven falls within the range of about 5 mm to 50 mm.

As just described, the valve actuator to which the present invention is applied applies a driving force to an object to be driven with the above-mentioned content. Although the main application is to motorize the manual valve, the present invention can also be used to apply the driving force to a steering wheel of a car, a rudder of a ship, etc. Further, the present invention is not limited thereto and can be used for applications in which the driving force can be applied with the same content.

Furthermore, in the applications of the conventional actuator, it is common to drive with content different from (1) to (5) described above. That is, the case where the application of driving force using the actuator is required is, for example, such an application that the handle is rotated to lift a heavy object by 1 to 2 m (for example, opening and closing of a gate). In this case, the rotation operation of the handle may reach several tens or more times, and the time during which the rotation operation is continuously performed may be several minutes or several tens of minutes. The rotation speed of the output shaft requires a faster rotation speed such as 100 rpm or more. Furthermore, the distance where the object moves becomes a longer stroke distance of 1 to 2 m. As just described, the applications of the general actuator and the applications of the valve actuator to which the present invention is applied are completely different in driving content.

From the content as described above, in the motor 5 of the valve actuator 1 to which the present invention is applied, the upper CPU 521 included in the servo driver 51 is configured to adjust the magnitude of the current flowing to the motor 5 (control the lower CPU 520) in accordance with the sliding resistance when the handle 21 is rotated.

Further, a maximum current value, which is the maximum current value that can be supplied within the predetermined drive time, is set for the motor 5, and the upper CPU 521 is configured to adjust the value of the current flowing to the motor 5 within the range of the predetermined drive time and the maximum current value. Note that the standard referred to here is information on conditions related to operation guarantee set by the motor manufacturer with respect to the drive of the motor 5.

More specifically, the motor in the conventional actuator has a rated current determined in which the operation is guaranteed even in continuous operation, and in a general-purpose controller, it is specified that the motor is driven under operating conditions based on the rated current. Further, the value of about 3 times the rated current is determined as the maximum current if it is a short time, and the operation of the motor is guaranteed even if the motor is rotated at the maximum current value for a specified time or less.

Further, in the general-purpose controller, the valve actuator is designed to be stopped when the operation conditions based on the rated current are not satisfied. The case where the operation conditions based on the rated current are not satisfied is, for example, a case where a current value larger than the rated current flows for a certain period of time or more, or a case where a current value larger than the rated current flows multiple times within a predetermined time. Such operating conditions based on the rated current are set in order to prevent the motor from being damaged when power is forcibly supplied to the motor.

Therefore, in the motor 5 of the valve actuator 1 of the present invention, the upper CPU 521 is configured to adjust the value of the current flowing to the motor 5 considering the sliding resistance. Further, the upper CPU 521 is configured to adjust the value of the current flowing to the motor 5 within the range of the predetermined drive time and the maximum current value set by the standard of the motor 5.

With this setting, in the motor 5, a torque about three times larger than when the rated current is applied can be exerted by applying a current close to the maximum current to the motor when the sliding resistance is large and a high torque is required in the opening and closing of the valve. Further, the upper CPU 521 can return the rotation speed and the value of the current flowing to the motor 5 to the normal setting conditions after the sliding resistance is lowered and the situation where the high torque is required has completed.

As described above, in the valve actuator 1 to which the present invention is applied, the upper CPU 521 can adjust the magnitude of the current flowing to the motor 5 considering the sliding resistance when the handle is rotated. Therefore, even if a small-output and small-sized motor is used, the amount of work required to open and close the handle can be output within the range of the predetermined drive time and the maximum current value specified by the motor manufacturer by reducing the number of rotations of the motor as the load increases and supplying a large current at a value of the maximum current value or less to increase the torque.

In other words, even if a small motor is used, a drive output equal to or greater than that of the case where a conventional large motor is operated at a rated current can be obtained. Further, since the small motor can be used, it contributes to a size reduction of the entire actuator.

The valve actuator 1 to which the present invention is applied and the motor 5 can be manufactured, for example, in the following sizes.

First, in the case of a structure that can be driven by a DC power supply, the actuator body 3 can be designed with a size of a height from an upper end of the handle 21 of the valve 2 to an upper end of the actuator body 3 of 72 mm, a width of 157 mm, and a length of 170 mm. Further, the height of only the case 30 of the actuator body 3 can be designed with a size of 56 mm.

Further, for the motor 5, a size having a height and width of 40 mm, a length of 95 mm, and an output of 100 W can be used. Further, the servo driver 51 can be designed with a size having a width of 30 mm, a length of 80 mm, and a height of 14 mm. Note that this motor 5 can exhibit the same performance as a motor having a size of 80 mm in height and width, 116 mm in length, and 400 W in output.

The above-mentioned valve actuator 1 to which the present invention is applied is sufficiently small in size, yet can control the drive of the opening and closing of the valve 2. Further, the valve actuator 1 is capable of independent control and can control the rotation operation of the handle 21 with high precision without intervention of an operator's hand.

Subsequently, a structure of another example of the valve actuator to which the present invention is applied will be described with reference to FIG. 10 to FIG. 13.

Note that in the following description, the description will focus on points different from the structure of the valve actuator 1 described above, and a description of the overlapping range will be omitted.

A valve actuator 1*a*, which is another example of the valve actuator to which the present invention is applied is different from the valve actuator 1 described above mainly in a structure of the valve attachment part. The valve actuator 1*a* has an actuator body 3*a* and a valve attachment part 4*a* (see FIG. 10 and FIG. 11).

Further, the actuator body 3*a* has a box-shaped case 30*a* and a bracket part 8*a*. Further, the case 30*a* has a protruding portion 300*a* for fixing the valve attachment part 4*a* (see FIG. 10).

Figure 10:
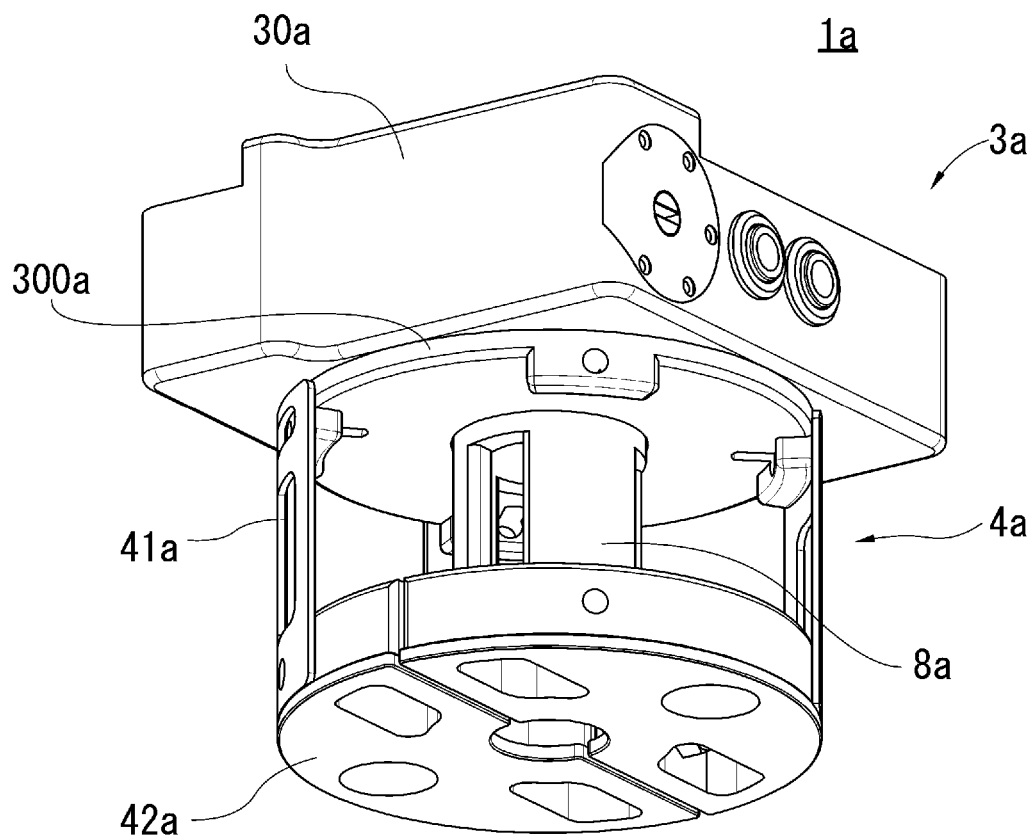
FIG. 10 is a schematic perspective view showing an overall structure of a valve actuator, which is another example of the valve actuator according to the present invention, and a valve attachment part.
Figure 11:
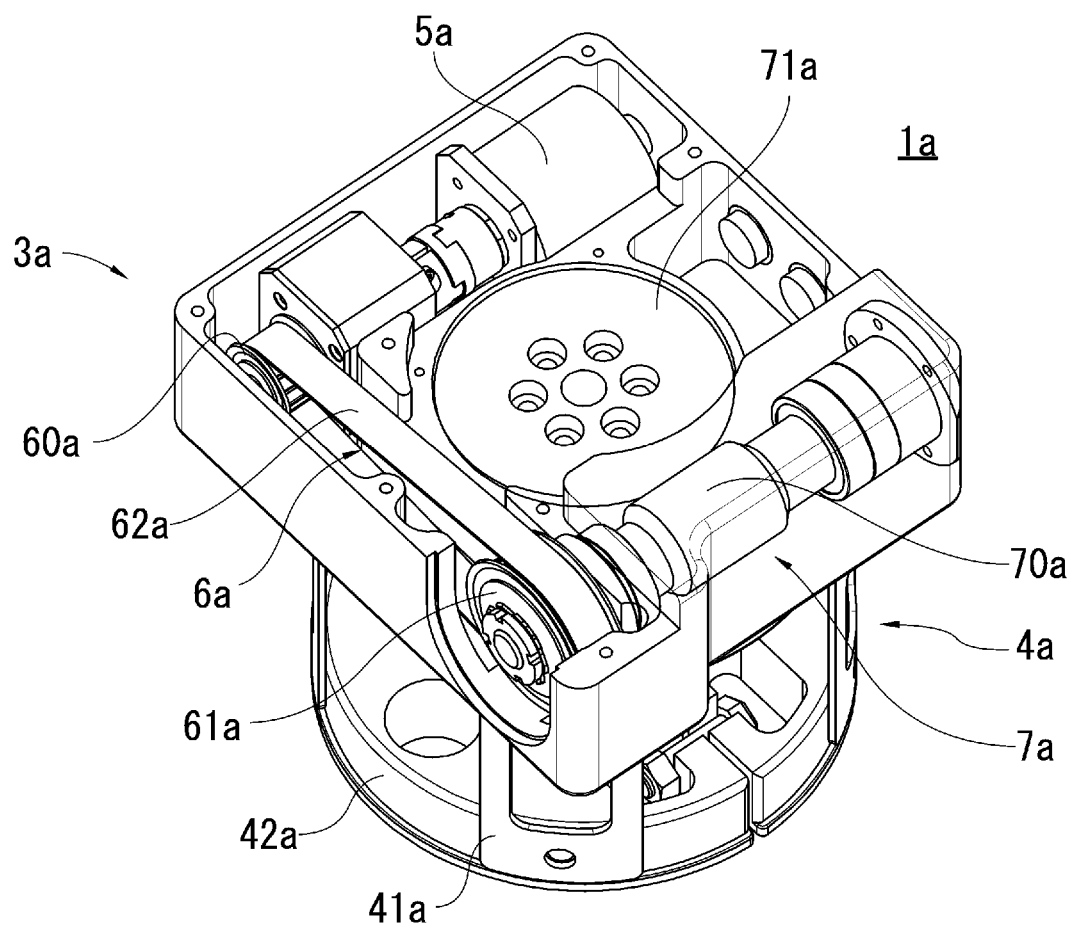
FIG. 11 is a schematic perspective view showing an internal structure of a case in the valve actuator when the valve actuator and the valve attachment part shown in FIG. 10 are viewed from above.
Figure 13:
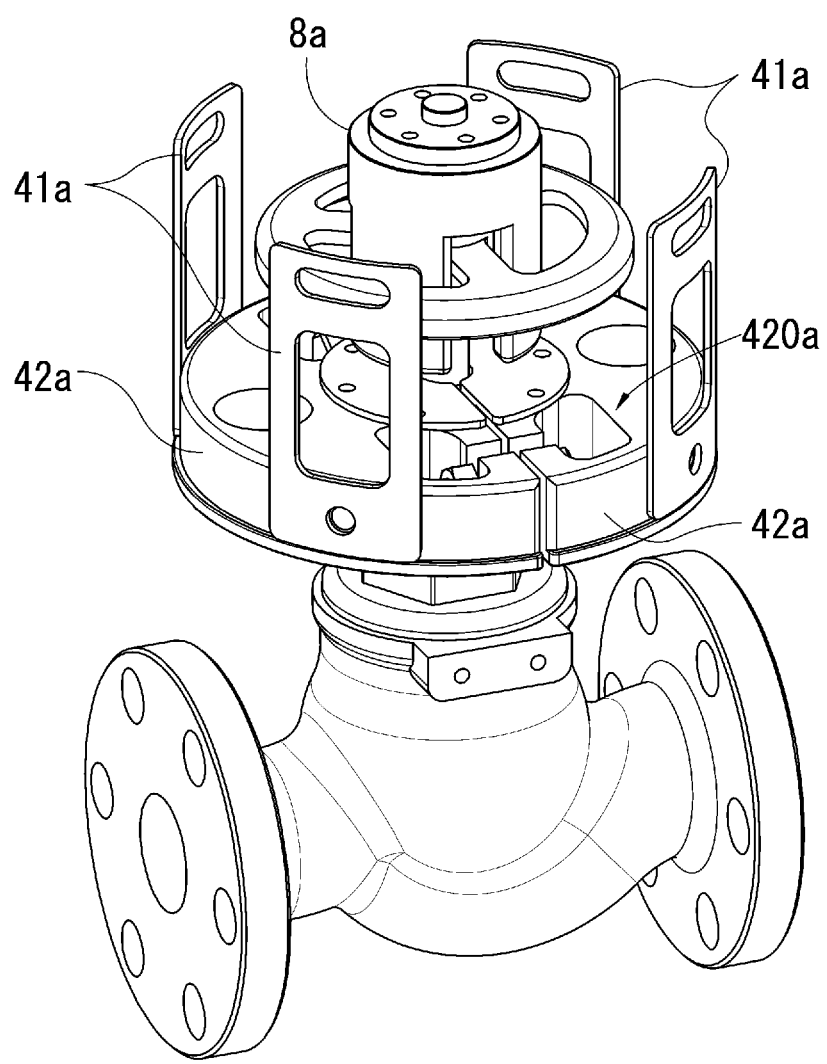
FIG. 13 is a schematic perspective view showing a positional relationship between a bracket part and the valve attachment part in the valve actuator and a structure of the valve attachment part.

Further, the valve attachment part 4*a* has support column portions 41*a* and mounting flanges 42*a* (see FIG. 10, FIG. 11, and FIG. 13).

Figure 12:
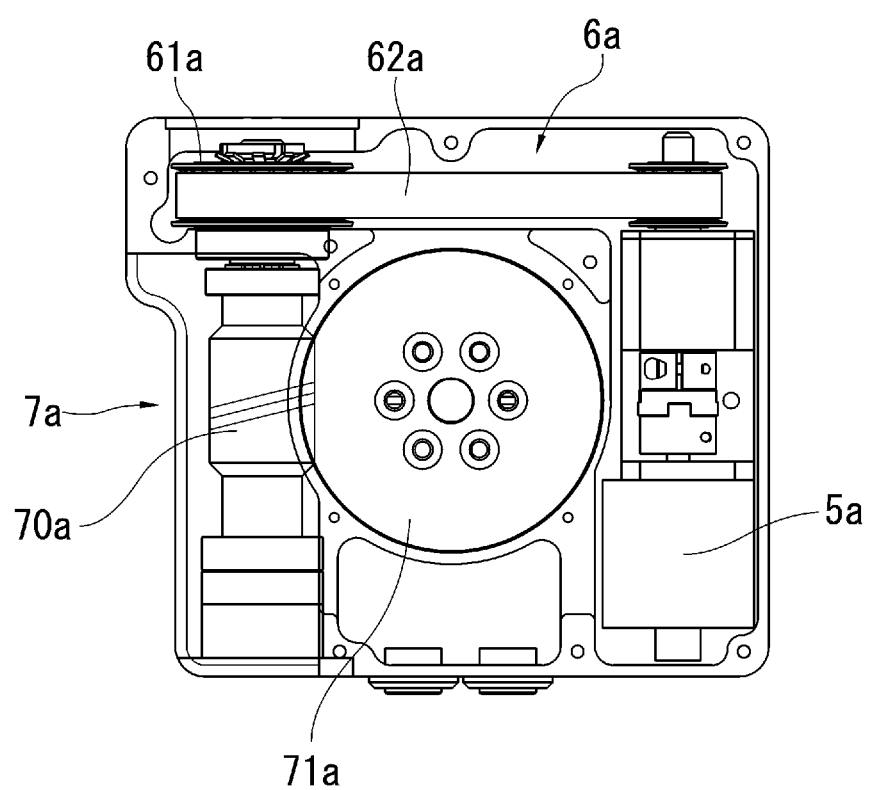
FIG. 12 is a schematic plan view showing the internal structure of the case in the valve actuator.

Further, the actuator body 3*a* has a motor 5*a*, a belt transmission part 6*a*, and a worm reduction gear 7*a* (see FIG. 11 and FIG. 12).

Further, the belt transmission part 6a has a small diameter pulley 60a, a large diameter pulley 61a, and a belt 62a. Further, the worm reduction gear 7a has a worm portion 70a and a worm wheel 71a (see FIG. 11 and FIG. 12).

The support column portions 41a of the valve attachment part 4a are fixed to an outer peripheral surface of the protruding portion 300a of the case 30a and serve as members that connect the case 30a and the mounting flanges 42a.

The mounting flanges 42a of the valve attachment part 4a are arranged outside a support portion (reference symbol omitted) provided to the valve body of the valve, are fixed with the support portion sandwiched between a pair of mounting flanges 42a, and serve as members that support the actuator body 3a at an upper portion of the valve.

Further, joining members (not shown) are each arranged in the pair of mounting flanges 42a, and mounting holes 420a for connecting the two mounting flanges 42a are formed (see FIG. 13). An operator can fix the mounting flanges 42a to the valve simply by arranging the mounting flanges 42a so as to sandwich the support portion of the valve and placing the joining members into the mounting holes 420a.

In this manner, the valve actuator to which the present invention is applied can be attached to the valve with various structures.

As described above, the actuator to which the present invention is applied can easily be attached to the manual valve, can motorize the valve, is sufficiently reduced in size so as to be placeable in a narrow installation space, has excellent power transmission performance, and is capable of high precision control.

LIST OF REFERENCE CHARACTERS

1 Valve actuator
2 Valve
20 Body
21 Handle
210 Frame portion
211 Spoke portion
22 Flange
200 Pipe
3 Actuator body
31 Lid portion
32 Female connector
30 Case
300 Protruding portion
301 Mounting hole
4 Valve attachment part
40 Adapter
41 Mounting plate
42 Stand portion
420 Bolt
421 Nut
500 Clamp knob screw
5 Motor
51 Servo driver
520 Lower CPU
521 Upper CPU
522 Network CPU
523 Top CPU
53 Operator portion
6 Belt transmission part
60 Small diameter pulley
61 Large diameter pulley
62 Belt
600 AC/DC converter
601 Male connector
7 Worm reduction gear
70 Worm portion
71 Worm wheel
8 Bracket part
80 Slit

The invention claimed is:

1. A valve actuator comprising:
a case, which is box-shaped;
a motor that is disposed inside the case and serves as a drive source, wherein the motor has a rotary shaft;
a first pulley that is attached to the rotary shaft;
a second pulley that has a diameter larger than that of the first pulley;
a belt that connects the first pulley to the second pulley to rotate the first pulley and the second pulley in the same direction;
a worm reduction gear that has a worm portion and a worm wheel, wherein the worm portion is attached to the second pulley and engaged with the worm wheel to orthogonally drive the worm wheel by meshing of gears between the worm portion and the worm wheel, wherein the worm reduction gear is disposed inside the case;
a valve attachment part that is attached to a preexisting valve and supports the case above a handle, wherein the preexisting valve has the handle; and
a bracket part that is attached to the worm reduction gear, is configured to be rotatable by a driving force of the motor, is disposed between the case and the handle, and is fitted to the handle to open and close the preexisting valve,
wherein the first pulley, the second pulley, and the belt are housed inside the case,
the rotary shaft, the belt, the worm portion, and the worm wheel are arranged at substantially the same level in a vertical direction, and the worm wheel is arranged to be surrounded by the rotary shaft, the belt, and the worm portion, and
the valve attachment part has a plate-like support portion that supports the case and that is formed in an orientation perpendicular to an axial direction of a pipe connected to the preexisting valve.

2. The valve actuator according to claim 1, wherein decreasing a size ratio of the diameter of the first pulley to the diameter of the second pulley decreases rotation speed of the second pulley to increase torque obtained from the rotary shaft of the motor.

3. The valve actuator according to claim 1, wherein an angle formed by the rotary shaft and the belt and an angle formed by the belt and the worm portion are each approximately 90 degrees.

4. The valve actuator according to claim 1, further comprising a motor driver that is disposed inside the case to control drive of the motor, wherein
the motor has an absolute encoder that stores an absolute position of the rotary shaft of the motor, and
the motor driver includes a first CPU for controlling a pulse signal that controls a position of rotation of the motor and a second CPU for controlling the first CPU and adjusting magnitude of a current flowing to the motor by considering sliding resistance when the handle is rotated.

5. The valve actuator according to claim 4, wherein a maximum current value, which is the maximum current value that can be supplied to the motor within a predetermined drive time, is set for the motor, and
the second CPU adjusts the current flowing to the motor within a range of the predetermined drive time and the maximum current value.

6. The valve actuator according to claim 1, wherein the handle has a frame portion and a plurality of spoke portions, wherein the frame portion forms an outer shape of the handle and the plurality of spoke portions connect a center portion of the handle and the frame portion, and
slits are formed on the bracket part, wherein the slits are fitted to the spoke portions.

7. The valve actuator according to claim 1, wherein the case includes a mounting protruding portion that is a substantially cylindrical body protruding from a bottom surface of the case toward the handle, wherein the bracket part is disposed inside the mounting protruding portion, and a plurality of mounting holes are formed on a circumference of an outer peripheral surface of the mounting protruding portion, and
the valve attachment part includes a pair of adapters which are configured to be attached to and detached from the mounting protruding portion via the mounting holes, wherein the pair of adapters sandwich and fasten the mounting protruding portion to the valve attachment part.

8. The valve actuator according to claim 1, wherein a size ratio of the diameter of the first pulley to the diameter of the second pulley is 1:2 or less.

9. A valve actuator comprising:
a case, which is box-shaped;
a motor that is disposed inside the case and serves as a drive source, wherein the motor has a rotary shaft;
a first pulley that is attached to the rotary shaft;
a second pulley that has a diameter larger than that of the first pulley;
a belt that connects the first pulley and the second pulley to rotate the first pulley and the second pulley in the same direction;
a worm reduction gear that has a worm portion and a worm wheel, wherein the worm portion is attached to the second pulley and engaged with the worm wheel to orthogonally drive the worm wheel by meshing of gears between the worm portion and the worm wheel, wherein the worm reduction gear is disposed inside the case and configured to rotate a preexisting valve; and
a valve attachment part that is attached to the preexisting valve and supports the case above the preexisting valve,
wherein the first pulley, the second pulley, and the belt, are housed inside the case,
the rotary shaft, the belt, the worm portion, and the worm wheel are arranged at substantially the same level in a vertical direction, and the worm wheel is arranged to be surrounded by the rotary shaft, the belt, and the worm portion, and
the valve attachment part has a plate-like support portion that supports the case and that is formed in an orientation perpendicular to an axial direction of a pipe connected to the preexisting valve.

* * * * *